United States Patent
Hirai

(10) Patent No.: US 7,939,475 B2
(45) Date of Patent: May 10, 2011

(54) MATING MEMBER AND A SLIDING MEMBER

(75) Inventor: Kazuo Hirai, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 12/805,470

(22) Filed: Aug. 2, 2010

(65) Prior Publication Data

US 2010/0298179 A1 Nov. 25, 2010

Related U.S. Application Data

(63) Continuation of application No. 10/567,586, filed as application No. PCT/JP2004/011261 on Aug. 5, 2004, now abandoned.

(30) Foreign Application Priority Data

Aug. 19, 2003 (JP) ................. 2003-295145

(51) Int. Cl.
*F16C 33/12* (2006.01)
*C08K 5/01* (2006.01)

(52) U.S. Cl. ........ 508/103; 508/100; 524/414; 524/423; 524/425; 524/487; 524/488; 524/508

(58) Field of Classification Search .................. 508/100, 508/103; 524/487, 488, 508
See application file for complete search history.

(56) References Cited

U.S. PATENT DOCUMENTS 5,677,055 A 10/1997 Ohkawachi et al.

FOREIGN PATENT DOCUMENTS

JP 2000-265048 9/2000

OTHER PUBLICATIONS

International Search Report of PCT/JP2004/011261, mailed Sep. 7, 2004.
Machine translation of JP 2000-0265048, Sep. 26, 2000.

*Primary Examiner* — Vickey Nerangis
(74) *Attorney, Agent, or Firm* — Nixon & Vanderhye P.C.

(57) ABSTRACT

A resin composition for sliding members which comprises 1 to 10 wt. % hydrocarbon wax, 0.1 to 3 wt. % at least one member selected from the group consisting of phosphates, sulfates, and carbonates, 1 to 20 wt. % phenoxy resin, 0.1 to 5 wt. % compatibilizing agent, and a polybutylene terephthalate resin as the remainder; and a sliding member obtained by molding the resin composition. The resin composition for sliding members and the sliding member obtained by molding the resin composition have excellent frictional and wearing properties even when a soft metal, e.g., an aluminum alloy, is used as a mating material.

7 Claims, No Drawings

MATING MEMBER AND A SLIDING MEMBER

This application is a continuation of application Ser. No. 10/567,586 filed Jul. 26, 2006 now abandoned which in turn is the US national phase of international application PCT/JP2004/011261, filed 5 Aug. 2004, which designated the U.S. and claims priority of JP 2003-295145, filed 19 Aug. 2003, the entire contents of each of which are hereby incorporated by reference.

TECHNICAL FIELD

The present invention relates to a resin composition for sliding member and a sliding member using the resin composition. More particularly, the present invention relates to a resin composition for sliding member which is excellent in friction and wear characteristics, in particular, when used together with a slide mating member composed of a soft metal such as an aluminum alloy, and a sliding member using the resin composition.

BACKGROUND ART

Thermoplastic polyester resins such as polybutylene terephthalate resins and polyethylene terephthalate resins have been extensively used as materials for mechanical elements such as bearings and gears because of good mechanical strength and wear resistance thereof. However, these thermoplastic polyester resins fail to exhibit sufficient friction and wear characteristics when used singly. Therefore, solid lubricants such as graphite, molybdenum disulfide and tetrafluoroethylene resins, lubricating oil agents such as mineral oils and waxes, or other low-frictional synthetic resins such as polyethylene resins are added to the thermoplastic polyester resins in order to enhance friction and wear characteristics thereof.

For example, there have been proposed the resin compositions which are composed of a polybutylene terephthalate resin and a specific amount of calcium stearate, and exhibit an excellent moldability (refer to Japanese Patent Application Laid-Open (KOKAI) No. 51-114454(1976)). Also, there have been proposed the resin compositions which are composed of a polyethylene terephthalate resin, a neutral or partially neutralized montan wax salt or montan wax ester salt and glass fibers, and exhibit an excellent moldability (refer to Japanese Patent Publication (KOKOKU) No. 58-46150 (1983)). In addition, there have been proposed the thermoplastic resin compositions which are obtained by melt-kneading a thermoplastic resin selected from the group consisting of polyamide resins, polyacetal resins, polyester resins and polycarbonate resins with a specific ultra-high molecular weight polyethylene resin powder, and exhibit excellent impact resistance and wear resistance (refer to Japanese Patent Publication (KOKOKU) No. 63-65232(1988)).

In recent years, with the progress of OA equipments such as copying machines, it has been required to reduce the weight of mechanical apparatuses and devices used therein. For this reason, as a material of a mating member for the sliding member, there have been used aluminum alloys. In the case of sliding members such as bearings, etc., materials, surface properties or the like of the mating member are important factors for attaining excellent friction and wear characteristics of the sliding members.

However, the sliding members produced from the resin compositions described in the above patent documents have such a problem that when used together with a mating member composed of aluminum alloys, a coefficient of friction thereof is high, and a wear amount thereof is large. Also, the surface of the mating member composed of aluminum alloys tends to be severely damaged depending upon use conditions thereof. Accordingly, it has been demanded to provide a sliding member exhibiting good friction and wear characteristics even when used together with a mating member composed of a soft metal such as aluminum alloys.

DISCLOSURE OF THE INVENTION

Problem to be Solved by the Invention

The present invention has been conducted to solve the above problems. An object of the present invention is to provide a resin composition for sliding member which is capable of exhibiting excellent friction and wear characteristics even when used together with a mating member composed of a soft metal such as aluminum alloys, as well as a sliding member using the resin composition.

Means for Solving the Problem

As a result of the present inventors' earnest study, it has been found that a sliding member produced from such a resin composition obtained by blending a polybutylene terephthalate resin as a main component with a specific amount of a hydrocarbon-based wax, at least one compound selected from the group consisting of a phosphate, a sulfate and a carbonate, a phenoxy resin and a compatibilizing agent, can exhibit excellent friction and wear characteristics.

The present invention has been attained on the basis of the above finding. To accomplish the aim, in a first aspect of the present invention, there is provided a resin composition for sliding member, comprising 1 to 10% by weight of a hydrocarbon-based wax, 0.1 to 3% by weight of at least one compound selected from the group consisting of a phosphate, a sulfate and a carbonate, 1 to 20% by weight of a phenoxy resin, 0.1 to 5% by weight of a compatibilizing agent, and the balance of a polybutylene terephthalate resin.

In a second aspect of the present invention, there is provided a resin composition for sliding member, which is produced by blending of 1 to 15% by weight of an aromatic polyamide resin or an aromatic polyester resin to the above resin composition.

In a third aspect of the present invention, there is provided a sliding member obtained by molding the above resin composition.

Effect of the Invention

In accordance with the present invention, there are provided a resin composition for sliding member which is capable of exhibiting excellent friction and wear characteristics even when used together with a mating member composed of a soft metal such as aluminum alloys, as well as a sliding member using the resin composition.

PREFERRED EMBODIMENT FOR CARRYING OUT THE INVENTION

The present invention is described in detail below. First, the resin composition for sliding member according to the present invention is explained. The resin composition for sliding member according to the present invention is produced by blending a hydrocarbon-based wax, at least one compound selected from the group consisting of a phosphate, a sulfate and a carbonate, a phenoxy resin, a compatibilizing agent, and a polybutylene terephthalate resin as a main component (hereinafter referred to merely as "PBT") with each other, and preferably further contains an aromatic polyamide resin or an aromatic polyester resin as a wear-resisting filler.

Examples of the hydrocarbon-based wax used in the present invention may include paraffin waxes, polyethylene waxes and microcrystalline waxes. These hydrocarbon-based waxes have not only the effect of reducing a coefficient of friction of the obtained sliding member, but also the effect of considerably reducing the damage to a slide mating member.

The amount of the hydrocarbon-based wax blended is usually 1 to 10% by weight, preferably 3 to 7% by weight, more preferably 5 to 7% by weight. When the amount of the hydrocarbon-based wax blended is less than 1% by weight, the hydrocarbon-based wax may fail to impart a sufficient low-frictional property to the resin composition, resulting in poor low-frictional property of the obtained resin composition. When the amount of the hydrocarbon-based wax blended is more than 10% by weight, the resultant resin composition tends to be deteriorated in moldability, and a sliding member produced from such resin composition tends to be deteriorated in strength.

The phosphate, sulfate and carbonate used in the present invention are substances having no lubricating property by themselves. However, when blended to a mixture of PBT and the hydrocarbon-based wax, these compounds can exhibit such an effect of promoting formation of a film composed of the mixture on the surface of a mating member upon sliding with the mating member, and enhancing a retention property of the film on the surface of the mating member as well as a durability thereof.

The amount of at least one compound selected from the phosphate, sulfate and carbonate is usually 0.1 to 3% by weight, preferably 0.5 to 2% by weight. When the amount of the compound blended is less than 0.1% by weight, it may be difficult to exhibit the effect of promoting formation of a film composed of a mixture of PBT and the hydrocarbon-based wax on the surface of a mating member, and enhancing a retention property of the film on the surface of the mating member as well as a durability thereof. When the amount of the compound blended is more than 3% by weight, the resultant composition tends to be deteriorated in capability of forming a film composed of the mixture on the surface of the mating member, so that it may be difficult to form a good film composed of the mixture on the surface of the mating member, resulting in poor friction and wear characteristics of the obtained sliding member.

Examples of the phosphate may include trilithium phosphate, dilithium hydrogenphosphate, tricalcium phosphate and calcium monohydrogenphosphate. Among these phosphates, preferred is trilithium phosphate. Examples of the sulfate may include calcium sulfate and barium sulfate. Among these sulfates, preferred is barium sulfate. Examples of the carbonate may include lithium carbonate, magnesium carbonate, calcium carbonate, strontium carbonate and barium carbonate. Among these carbonates, preferred are lithium carbonate and calcium carbonate.

The phenoxy resin used in the present invention may include thermoplastic resins which are in the form of a linear polymer obtained by condensation reaction between bisphenol A and epichlorohydrin, and represented by the following formula:

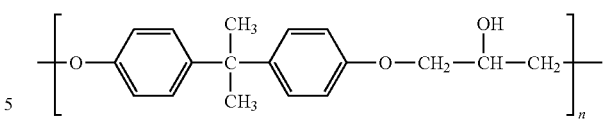

Specific examples of the phenoxy resin may include "PHE-NOTOHTO" (tradename, produced by Tohto Kasei Co., Ltd.).

When a predetermined amount of the phenoxy resin is blended in a mixture composed of the above hydrocarbon-based wax, the at least one compound selected from the group consisting of the phosphate, sulfate and carbonate, and PBT, the phenoxy resin is compatibilized with PBT together with the below-mentioned compatibilizing agent, resulting in enhanced wear resistance of the obtained sliding member as well as such effects of enhancing a melt-viscosity of PBT and improving a moldability of the resin composition upon molding.

The amount of the phenoxy resin blended is usually 1 to 20% by weight, preferably 5 to 15% by weight, more preferably 10 to 15% by weight. When the amount of the phenoxy resin blended is less than 1% by weight, it may be difficult to attain a sufficient effect of enhancing a wear resistance of the resultant sliding member. When the amount of the phenoxy resin blended is more than 20% by weight, the resultant sliding member tends to damage a mating member upon sliding, and tends to be deteriorated in mechanical strength.

As the compatibilizing agent, there may be used modified olefin resins containing an epoxy group in a molecule thereof. Specific examples of the compatibilizing agent may include "BONDFAST" (tradename, produced by Sumitomo Kagaku Kogyo Co., Ltd.) in the form of a copolymer of ethylene with glycidyl methacrylate which may be further copolymerized with vinyl acetate or methyl methacrylate as a third component, and "MODIPER A4000 Series" (tradename, produced by Nippon Yushi Co., Ltd.) in the form of a graft copolymer obtained by grafting polystyrene, polymethyl methacrylate or an acrylonitrile-styrene copolymer to a copolymer of ethylene with glycidyl methacrylate. The content of an epoxy-containing copolymer component (for example, glycidyl methacrylate) in the modified olefin resin is usually 1 to 20% by weight, preferably 3 to 15% by weight, more preferably 6 to 12% by weight.

The compatibilizing agent is compatibilized with PBT as a main component and the above phenoxy resin blended simultaneously with the compatibilizing agent to allow the phenoxy resin to exhibit the effect of enhancing a wear resistance of the resultant sliding member. Further, the compatibilizing agent can be compatibilized with the above hydrocarbon-based wax owing to an ethylene component contained therein, thereby improving a dispersibility of the hydrocarbon-based wax in the resin composition and exhibiting the effect of preventing the resultant molded product from suffering from peeling-off or separation due to the hydrocarbon-based wax blended. The amount of the compatibilizing agent blended is usually 0.1 to 5% by weight, preferably 1 to 3% by weight. When the amount of the compatibilizing agent blended is less than 0.1% by weight, it may be difficult to exhibit the above effects of enhancing a wear resistance of the sliding member and a moldability of the resin composition. When the amount of the compatibilizing agent blended is more than 5% by weight, although the moldability of the resin composition is enhanced, the wear resistance of the resultant sliding member tends to be rather adversely affected thereby.

The PBT used in the present invention is a thermoplastic resin obtained by polycondensing terephthalic acid or dimethyl terephthalate with butanediol, and is characterized by (1) a low coefficient of friction and an excellent wear resistance, (2) a high melting point (225° C.), (3) an excellent chemical resistance, and (4) a water absorption of not more than 0.1%. The amount of the PBT blended is the balance calculated by subtracting the amount of blended components other than PBT from a total amount of the resin composition, and is preferably 60 to 90% by weight, more preferably 65 to 80% by weight.

Examples of the aromatic polyamide resin used in the present invention may include meta-type poly-m-phenylene isophthalamide resins, para-type poly-p-phenylene terephthalamide resins and copoly-p-phenylene-3,4'-oxydiphenylene-terephthalamide resins. Specific examples of the meta-type poly-m-phenylene isophthalamide resins may include "CONEX" (tradename, produced by Teijin Co., Ltd.) and "NOMEX" (tradename, produced by DuPont Corp.). Specific examples of the para-type poly-p-phenylene terephthalamide resins may include "KEVLAR" (tradename, produced by DuPont Corp.) and "TWARON" (tradename, produced by Teijin Twaron Co., Ltd.). Specific examples of the copoly-p-phenylene-3,4'-oxydiphenylene terephthalamide resins may include "TECHNORA" (tradename, produced by Teijin Co., Ltd.). These aromatic polyamide resins may be used in the form of a powder, cut fibers or a pulp.

The aromatic polyester resins used in the present invention are oxybenzoyl polyesters having a repeating unit represented by the following formula:

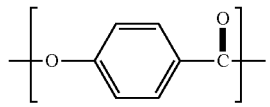

Examples of the aromatic polyester resin may include homopolymers of p-hydroxybenzoic acid and copolymers of p-hydroxybenzoic acid with an aromatic dicarboxylic acid and an aromatic diol. Among these aromatic polyester resins, preferred are homopolymers of p-hydroxybenzoic acid. These resins have a plate-shaped crystal structure and are excellent in self-lubricating property. Specific examples of the aromatic polyester resin may include "SUMIKASUPER-LCP" (tradename, produced by Sumitomo Kagaku Kogyo Co., Ltd.). These aromatic polyester resins may be used in the form of a powder.

The aromatic polyamide resin and the aromatic polyester resin can exhibit the effect of enhancing a wear resistance of the resultant sliding member. The amount of the aromatic polyamide resin or the aromatic polyester resin blended is preferably 1 to 15% by weight, more preferably 5 to 15%. When the amount of the aromatic polyamide resin or the aromatic polyester resin blended is less than 1% by weight, it may be difficult to attain the effect of enhancing a wear resistance of the resultant sliding member. When the amount of the aromatic polyamide resin or the aromatic polyester resin blended is more than 15% by weight, the obtained resin composition may tend to be deteriorated in moldability, and the molded product obtained therefrom tends to be deteriorated in strength.

In the present invention, the resin composition may also contain a solid lubricant or a lubricating oil agent such as lubricating oils and higher fatty acids in order to further enhance a low-frictional property thereof. Examples of the solid lubricant may include graphite, boron nitride, tetrafluoroethylene resins and polyethylene resins. Examples of the lubricating oils may include mineral oils such as engine oils and machine oils, plant oils such as castor oil, and synthetic oils such as ester oils and silicone oils. Examples of the higher fatty acids may include saturated aliphatic acids having 14 or more carbon atoms such as myristic acid, palmitic acid, stearic acid, behenic acid and montanic acid, unsaturated aliphatic acids having 18 or more carbon atoms such as oleic acid and erucic acid. The amount of the solid lubricant or the lubricating oil agent blended is preferably 1 to 5% by weight.

The resin composition for sliding member according to the present invention may be produced by blending the above respective components with each other at a predetermined mixing ratio using a mixer such as a Henschel mixer, a super mixer, a ball mill and a tumbler mixer.

The sliding member of the present invention may be produced by molding the above resin composition for sliding member. The resin composition for sliding member may be molded by either a direct molding method using an injection-molding machine or an extrusion-molding machine, or an indirect molding method, in which the resin composition for sliding member is once formed into pellets, and then the pellets are molded into the sliding member using an injection-molding machine or an extrusion-molding machine. The latter indirect molding method is explained more specifically below. That is, the resin composition for sliding member is charged into an extrusion-molding machine, which is controlled to a cylinder temperature of 200 to 250° C., a die temperature of 230 to 250° C. and a screw rotating speed of 150 to 300 rpm, to obtain a strand-shaped molded product, and then the thus obtained strand-shaped molded product is cut into pellets. Then, the pellets as a molding material are charged into an injection-molding machine, which is controlled to a cylinder temperature of 200 to 260° C., a mold temperature of 60 to 80° C., a nozzle temperature of 220 to 250° C. and an injection pressure of 500 to 800 kgf/cm$^2$, to obtain a molded product having a desired shape.

The sliding member of the present invention can exhibit excellent friction and wear characteristics when used together with a slide mating member composed of a soft metal such as aluminum alloys. For example, when being subjected to a journal test, the sliding member of the present invention can exhibit a coefficient of friction (upon stable condition) of usually not more than 0.18, preferably not more than 0.16, and a wear amount of not more than 15 μm, preferably not more than 10 μm. Therefore, the sliding member of the present invention can be suitably used as those members which undergo slide contact, such as slide bearings, slide bearing devices and sealing materials for use in office and information equipments, electric equipments, domestic appliances, etc.

EXAMPLES

The present invention is described in more detail by Examples, but the Examples are only illustrative and not intended to limit the scope of the present invention.

Examples 1 to 26

In Examples 1 to 26, the respective components are blended with each other at mixing ratios shown in Tables 2 to 8 using a Henschel mixer, thereby obtaining a mixture thereof. The thus obtained mixture was charged into an extrusion-molding machine, which was controlled to a cylinder temperature of 200 to 250° C., at die temperature of 240° C.

and a screw rotating speed of 200 rpm, to obtain a strand-shaped molded product. The thus obtained strand-shaped molded product was cut into pellets. The thus obtained pellets were charged into a hopper of an injection-molding machine, which was controlled to a cylinder temperature of 200 to 250° C., a mold temperature of 70° C., a nozzle temperature of 240° C. and an injection pressure of 600 kgf/cm², to produce a cylindrical test specimen (sliding member) having an inner diameter of 10 mm, an outer diameter of 14 mm and a length of 10 mm.

Comparative Examples 1 to 4

In Comparative Examples 1 to 4, the respective components are blended with each other at mixing ratios shown in Table 9 using a Henschel mixer, thereby obtaining a mixture thereof. Successively, the same procedure as defined in Example 1 was conducted using the thus obtained mixture, thereby producing a cylindrical test specimen (sliding member) having an inner diameter of 10 mm, an outer diameter of 14 mm and a length of 10 mm.

The cylindrical test specimens produced in Examples 1 to 26 and Comparative Examples 1 to 4 were subjected to a journal test to determine sliding properties thereof. The conditions of the journal test are shown in Table 1. The sliding properties of the respective test specimens are shown in Tables 2 to 9. Meanwhile, the coefficient of friction of each test specimen as shown in Tables is the value obtained at the stage where the sliding motion of the sliding member was shifted to a stable condition after initiation of the journal test. The wear amount was represented by a change in dimension of each cylindrical test specimen (sliding member) after completion of the journal test from that before initiation of the journal test. Further, the mating member was observed after the journal test to evaluate surface conditions thereof. The evaluation results are classified into the following ranks.

A: No damage on the surface of the mating member
B: Remarkable damage on the surface of the mating member.

TABLE 1

| | |
|---|---|
| Slide velocity | 20 m/min |
| Load | 5 kgf |
| Mating member | Aluminum alloy (JIS-H-4001; Symbol: A5052) |
| Testing time | 24 hr |
| Lubrication | No lubrication |

TABLE 2

| | Examples | | | |
|---|---|---|---|---|
| | 1 | 2 | 3 | 4 |
| Composition | | | | |
| PBT | 90.5 | 90.5 | 90.5 | 82.5 |
| Hydrocarbon-based wax | | | | |
| Paraffin wax | 3 | — | — | 5 |
| Polyethylene wax | — | 3 | — | — |
| Microcrystalline wax | — | — | 3 | — |
| Phosphate | | | | |
| Trilithium phosphate | 1 | — | — | 1 |
| Sulfate | | | | |
| Barium sulfate | — | 1 | — | — |

TABLE 2-continued

| | Examples | | | |
|---|---|---|---|---|
| | 1 | 2 | 3 | 4 |
| Carbonate | | | | |
| Calcium carbonate | — | — | — | — |
| Lithium carbonate | — | — | 1 | — |
| Phenoxy resin | 5 | 5 | 5 | 10 |
| Compatibilizing agent | 0.5 | 0.5 | 0.5 | 1.5 |
| Various properties | | | | |
| Journal test | | | | |
| Friction coefficient (upon stable condition) | 0.174 | 0.172 | 0.171 | 0.153 |
| Wear amount (μm) | 12.0 | 11.8 | 11.8 | 9.0 |
| Surface conditions of mating member | A | A | A | A |

TABLE 3

| | Examples | | | |
|---|---|---|---|---|
| | 5 | 6 | 7 | 8 |
| Composition | | | | |
| PBT | 82.5 | 82.5 | 76 | 76 |
| Hydrocarbon-based wax | | | | |
| Paraffin wax | — | — | 5 | — |
| Polyethylene wax | 5 | 5 | — | 5 |
| Microcrystalline wax | — | — | — | — |
| Phosphate | | | | |
| Trilithium phosphate | — | — | 1 | — |
| Sulfate | | | | |
| Barium sulfate | 1 | — | — | 1 |
| Carbonate | | | | |
| Calcium carbonate | — | 1 | — | — |
| Lithium carbonate | — | — | — | — |
| Phenoxy resin | 10 | 10 | 15 | 15 |
| Compatibilizing agent | 1.5 | 1.5 | 3 | 3 |
| Various properties | | | | |
| Journal test | | | | |
| Friction coefficient (upon stable condition) | 0.151 | 0.152 | 0.169 | 0.167 |
| Wear amount (μm) | 8.7 | 8.9 | 12.6 | 12.3 |
| Surface conditions of mating member | A | A | A | A |

TABLE 4

| | Examples | | | |
|---|---|---|---|---|
| | 9 | 10 | 11 | 12 |
| Composition | | | | |
| PBT | 76 | 80 | 80 | 80 |
| Hydrocarbon-based wax | | | | |
| Paraffin wax | — | 7 | — | — |
| Polyethylene wax | 5 | — | 7 | 7 |
| Microcrystalline wax | — | — | — | — |
| Phosphate | | | | |
| Trilithium phosphate | — | 1 | — | — |
| Sulfate | | | | |
| Barium sulfate | — | — | 1 | — |

TABLE 4-continued

| | Examples | | | |
|---|---|---|---|---|
| | 9 | 10 | 11 | 12 |
| Carbonate | | | | |
| Calcium carbonate | — | — | — | 1 |
| Lithium carbonate | 1 | — | — | — |
| Phenoxy resin | 15 | 10 | 10 | 10 |
| Compatibilizing agent | 3 | 2 | 2 | 2 |
| Various properties | | | | |
| Journal test | | | | |
| Friction coefficient (upon stable condition) | 0.165 | 0.152 | 0.148 | 0.149 |
| Wear amount (μm) | 12.1 | 10.1 | 9.8 | 10.0 |
| Surface conditions of mating member | A | A | A | A |

TABLE 5

| | Examples | | | |
|---|---|---|---|---|
| | 13 | 14 | 15 | 16 |
| Composition | | | | |
| PBT | 77.5 | 77.5 | 79.5 | 74.5 |
| Hydrocarbon-based wax | | | | |
| Paraffin wax | — | — | — | — |
| Polyethylene wax | 5 | 5 | 5 | 5 |
| Microcrystalline wax | — | — | — | — |
| Phosphate | | | | |
| Trilithium phosphate | — | — | — | — |
| Sulfate | | | | |
| Barium sulfate | 1 | 1 | 1 | 1 |
| Carbonate | | | | |
| Calcium carbonate | — | — | — | — |
| Lithium carbonate | — | — | — | — |
| Phenoxy resin | 10 | 10 | 10 | 10 |
| Compatibilizing agent | 1.5 | 1.5 | 1.5 | 1.5 |
| Aromatic polyamide resin | | | | |
| Para-type poly-p-phenylene terephthalamide | — | — | 3 | 8 |
| Aromatic polyester resin | | | | |
| Homopolymer of p-hydroxybenzoic acid | — | — | — | — |
| Solid lubricant | | | | |
| Tetrafluoroethylene resin | 5 | — | — | — |
| Lubricating oil agent | | | | |
| Montanic acid | — | 5 | — | — |
| Various properties | | | | |
| Journal test | | | | |
| Friction coefficient (upon stable condition) | 0.142 | 0.144 | 0.152 | 0.153 |
| Wear amount (μ/m) | 9.2 | 9.0 | 7.3 | 4.7 |
| Surface conditions of mating member | A | A | A | A |

TABLE 6

| | Examples | | | |
|---|---|---|---|---|
| | 17 | 18 | 19 | 20 |
| Composition | | | | |
| PBT | 67 | 68 | 79.5 | 74.5 |
| Hydrocarbon-based wax | | | | |
| Paraffin wax | — | — | — | — |
| Polyethylene wax | 5 | 7 | 5 | 5 |
| Microcrystalline wax | — | — | — | — |
| Phosphate | | | | |
| Trilithium phosphate | — | — | — | — |
| Sulfate | | | | |
| Barium sulfate | 1 | 2 | 1 | 1 |
| Carbonate | | | | |
| Calcium carbonate | — | — | — | — |
| Lithium carbonate | — | — | — | — |
| Phenoxy resin | 10 | 10 | 10 | 10 |
| Compatibilizing agent | 2 | 3 | 1.5 | 1.5 |
| Aromatic polyamide resin | | | | |
| Para-type poly-p-phenylene terephthalamide | 15 | 10 | — | — |
| Aromatic polyester resin | | | | |
| Homopolymer of p-hydroxybenzoic acid | — | — | 3 | 8 |
| Solid lubricant | | | | |
| Tetrafluoroethylene resin | — | — | — | — |
| Lubricating oil agent | | | | |
| Montanic acid | — | — | — | — |
| Various properties | | | | |
| Journal test | | | | |
| Friction coefficient (upon stable condition) | 0.165 | 0.157 | 0.149 | 0.149 |
| Wear amount (μm) | 4.3 | 5.5 | 7.2 | 5.0 |
| Surface conditions of mating member | A | A | A | A |

TABLE 7

| | Examples | | | |
|---|---|---|---|---|
| | 21 | 22 | 23 | 24 |
| Composition | | | | |
| PBT | 67 | 68 | 69.5 | 69.5 |
| Hydrocarbon-based wax | | | | |
| Paraffin wax | — | — | — | — |
| Polyethylene wax | 5 | 7 | 5 | 5 |
| Microcrystalline wax | — | — | — | — |
| Phosphate | | | | |
| Trilithium phosphate | — | — | — | — |
| Sulfate | | | | |
| Barium sulfate | 1 | 1 | 1 | 1 |
| Carbonate | | | | |
| Calcium carbonate | — | 1 | — | — |
| Lithium carbonate | — | — | — | — |
| Phenoxy resin | 10 | 10 | 10 | 10 |
| Compatibilizing agent | 2 | 3 | 1.5 | 1.5 |
| Aromatic polyamide resin | | | | |
| Para-type poly-p-phenylene terephthalamide | — | — | 8 | 8 |

TABLE 7-continued

| | Examples | | | |
|---|---|---|---|---|
| | 21 | 22 | 23 | 24 |
| Aromatic polyester resin | | | | |
| Homopolymer of p-hydroxybenzoic acid | 15 | 10 | — | — |
| Solid lubricant | | | | |
| Tetrafluoroethylene resin | — | — | 5 | — |
| Lubricating oil agent | | | | |
| Montanic acid | — | — | — | 5 |
| Various properties | | | | |
| Journal test | | | | |
| Friction coefficient (upon stable condition) | 0.150 | 0.155 | 0.144 | 0.146 |
| Wear amount (μm) | 4.6 | 5.2 | 4.8 | 4.7 |
| Surface conditions of mating member | A | A | A | A |

TABLE 8

| | Examples | |
|---|---|---|
| | 25 | 26 |
| Composition | | |
| PBT | 69.5 | 69.5 |
| Hydrocarbon-based wax | | |
| Paraffin wax | — | — |
| Polyethylene wax | 5 | 5 |
| Microcrystalline wax | — | — |
| Phosphate | | |
| Trilithium phosphate | — | — |
| Sulfate | | |
| Barium sulfate | 1 | 1 |
| Carbonate | | |
| Calcium carbonate | — | — |
| Lithium carbonate | — | — |
| Phenoxy resin | 10 | 10 |
| Compatibilizing agent | 1.5 | 1.5 |
| Aromatic polyamide resin | | |
| Para-type poly-p-phenylene terephthalamide | — | — |
| Aromatic polyester resin | | |
| Homopolymer of p-hydroxybenzoic acid | 8 | 8 |
| Solid lubricant | | |
| Tetrafluoroethylene resin | 5 | — |
| Lubricating oil agent | | |
| Montanic acid | — | 5 |
| Various properties | | |
| Journal test | | |
| Friction coefficient (upon stable condition) | 0.144 | 0.143 |
| Wear amount (μm) | 5.2 | 5.1 |
| Surface conditions of mating member | A | A |

TABLE 9

| | Comparative Examples | | | |
|---|---|---|---|---|
| | 1 | 2 | 3 | 4 |
| Composition | | | | |
| PBT | 98 | 97 | 95 | 95 |
| Hydrocarbon-based wax | | | | |
| Paraffin wax | 2 | — | — | — |
| Polyethylene wax | — | 3 | — | — |
| Microcrystalline wax | — | — | — | — |
| Phosphate | | | | |
| Trilithium phosphate | — | — | — | — |
| Sulfate | | | | |
| Barium sulfate | — | — | — | — |
| Carbonate | | | | |
| Calcium carbonate | — | — | — | — |
| Lithium carbonate | — | — | — | — |
| Phenoxy resin | — | — | — | — |
| Compatibilizing agent | — | — | — | — |
| Solid lubricant | | | | |
| Tetrafluoroethylene resin | — | — | 5 | — |
| Lubricating oil agent | | | | |
| Montanic acid | — | — | — | 5 |
| Various properties | | | | |
| Journal test | | | | |
| Friction coefficient (upon stable condition) | 0.225 | 0.238 | * | * |
| Wear amount (μm) | 53 | 48 | * | * |
| Surface conditions of mating member | A | A | B | B |

Note
*: unmeasurable

The materials used in the above Tables are as follows:

PBT: "PELPRENE N-1040" (tradename, produced by Toyo Boseki Co., Ltd.); phenoxy resin: "PHENOTOHTO YP50-P" (tradename, produced by Tohto Kasei Co., Ltd.)

Compatibilizing agent: an ethylene-glycidyl methacrylate copolymer (glycidyl methacrylate content: 12% by weight) "BONDFAST E" (tradename, produced by Sumitomo Kagaku Kogyo Co., Ltd.)

p-Phenylene terephthalamide resin: "TWARON 5011" (tradename, produced by Teijin Twaron Co., Ltd.)

Homopolymer of p-hydroxybenzoic acid: "SUMIKASUPER LCP-E101M" (tradename, produced by produced by Sumitomo Kagaku Kogyo Co., Ltd.)

From the above results, it was confirmed that all of the sliding members according to the present invention were excellent in friction and wear characteristics, and that no damage to the surface of the mating members was recognized after the test. On the other hand, it was confirmed that the sliding members obtained by molding the resin compositions produced in Comparative Examples 1 and 2 exhibited a high coefficient of friction and a large wear amount, and therefore, were deteriorated in friction and wear characteristics. Further, in the sliding members obtained by molding the resin compositions produced in Comparative Examples 3 and 4, since a coefficient of friction thereof was rapidly increased immediately after initiation of the test, and severe damage like scratches was recognized on the surface of the mating members, the test was interrupted.

The invention claimed is:

1. In combination:
a mating member and
a sliding member,
wherein:
the mating member and the sliding member are in contact with each other;
the mating member is composed of an aluminum alloy, and
the sliding member in contact with the mating member is in the form of film which film comprises 1 to 10% by weight of a hydrocarbon-based wax, 0.1 to 3% by weight of at least one compound selected from the group consisting of a phosphate, a sulfate and a carbonate, 1 to 20% by weight of a phenoxy resin, 0.1 to 5% by weight of a modified olefin resin containing an epoxy group in a molecule thereof as a compatibilizing agent, and the balance of a polybutylene terephthalate resin.

2. The combination of claim 1, wherein the film further comprising 1 to 15% by weight of an aromatic polyamide resin or an aromatic polyester resin.

3. The combination of claim 1, wherein the hydrocarbon-based wax in the film is a paraffin wax, a polyethylene wax or a microcrystalline wax.

4. The combination of claim 1, wherein the phosphate in the film is trilithium phosphate, the sulfate is barium sulfate, and the carbonate is lithium carbonate or calcium carbonate.

5. The combination of claim 1, wherein the modified olefin resin in the film is an ethylene-glycidyl methacrylate copolymer.

6. The combination of claim 2, wherein the aromatic polyamide resin is a poly-m-phenylene isophthalamide resin, a poly-p-phenylene terephtahalamide resin or a copoly-p-phenylene-3,4'-oxydiphenylene terephtahalamide resin.

7. The combination of claim 2, wherein the aromatic polyester resin is a homopolymer of p-hydroxybenzoic acid.

* * * * *